US012176632B2

(12) United States Patent
Zhang et al.

(10) Patent No.: US 12,176,632 B2
(45) Date of Patent: Dec. 24, 2024

(54) DUAL-POLARIZED FILTERING ANTENNA UNITS AND DUAL-POLARIZED FILTERING ANTENNA ARRAYS

(71) Applicant: South China University of Technology, Guangzhou (CN)

(72) Inventors: Xiuyin Zhang, Guangzhou (CN); Shufeng Yao, Guangzhou (CN); Shengjie Yang, Guangzhou (CN)

(73) Assignee: South China University of Technology, Guangzhou (CN)

( * ) Notice: Subject to any disclaimer, the term of this patent is extended or adjusted under 35 U.S.C. 154(b) by 0 days.

(21) Appl. No.: 17/914,449

(22) PCT Filed: Nov. 17, 2021

(86) PCT No.: PCT/CN2021/131269
§ 371 (c)(1),
(2) Date: Sep. 26, 2022

(87) PCT Pub. No.: WO2022/242069
PCT Pub. Date: Nov. 24, 2022

(65) Prior Publication Data

US 2024/0396218 A1 Nov. 28, 2024

(30) Foreign Application Priority Data

May 18, 2021 (CN) ......................... 202110537792.6

(51) Int. Cl.
*H01Q 9/04* (2006.01)
*H01Q 5/28* (2015.01)
(Continued)

(52) U.S. Cl.
CPC ............. *H01Q 9/0414* (2013.01); *H01Q 5/28* (2015.01); *H01Q 5/314* (2015.01); *H01Q 21/061* (2013.01)

(58) Field of Classification Search
CPC ...... H01Q 21/065; H01Q 3/44; H01Q 21/064; H01Q 3/34; H01Q 1/38; H01Q 21/0012
See application file for complete search history.

(56) References Cited

U.S. PATENT DOCUMENTS

2004/0160368 A1* 8/2004 Huang .................. H01Q 5/371
343/895
2010/0149063 A1* 6/2010 Chan ........................ H01Q 5/00
343/845
(Continued)

FOREIGN PATENT DOCUMENTS

CN 101728643 A 6/2010
CN 102280704 A 12/2011
(Continued)

OTHER PUBLICATIONS

Siddiqui, Zeeshan, Dual-Polarized Filtering Antenna for mm-Wave 5G Base Station Antenna Array 2021, 15the European Conference on Antennas and Propagation (EuCAP) 26.3, 2021 (Mar. 26, 2021).
(Continued)

*Primary Examiner* — Wei (Victor) Y Chan
(74) *Attorney, Agent, or Firm* — The Dobrusin Law Firm, P.C.

(57) ABSTRACT

The present application relates to a dual-polarized filtering antenna unit and a dual-polarized filtering antenna array, and relates to the technical field of antennas. The dual-polarized filtering antenna unit comprises a metal substrate and a radiating layer, a plurality of dielectric layers are provided between the metal substrate and the radiating layer, and a first via hole and a second via hole are provided on each dielectric layer, wherein the first via holes and the second via holes are for accommodating metal pillars, and the metal pillars are for transmitting current signals. Axes of the first via holes of the plurality of dielectric layers are parallel or coincident. The first via holes of the adjacent dielectric
(Continued)

layers are electrically connected through the metal layer between the adjacent dielectric layers.

18 Claims, 13 Drawing Sheets

(51) Int. Cl.
*H01Q 5/314* (2015.01)
*H01Q 21/06* (2006.01)

(56) References Cited

U.S. PATENT DOCUMENTS

| | | | | |
|---|---|---|---|---|
| 2012/0024254 | A1 | 9/2012 | Fujii et al. | |
| 2014/0111393 | A1* | 4/2014 | Lo Hine Tong | H01Q 21/28<br>343/770 |
| 2019/0205714 | A1* | 7/2019 | Forster | G06K 7/0008 |
| 2020/0212530 | A1* | 7/2020 | Zhu | H01P 1/2088 |

FOREIGN PATENT DOCUMENTS

| | | | |
|---|---|---|---|
| CN | 102354809 | A | 2/2012 |
| CN | 103779657 | A | 5/2014 |
| CN | 106058442 | A | 10/2016 |
| CN | 106067602 | A | 11/2016 |
| CN | 208570901 | U | 3/2019 |
| CN | 109728425 | A | 5/2019 |
| CN | 109742525 | A | 5/2019 |
| CN | 111758183 | A | 10/2020 |
| CN | 112490657 | A | 3/2021 |
| CN | 112968281 | A | 6/2021 |
| TW | 578333 | B | 9/2004 |

OTHER PUBLICATIONS

International Search Report dated Feb. 15, 2022, Application No. PCT/CN2021/131269.

* cited by examiner

2

3

DUAL-POLARIZED FILTERING ANTENNA UNITS AND DUAL-POLARIZED FILTERING ANTENNA ARRAYS

CROSS-REFERENCE TO RELATED APPLICATIONS

This application claims the priority of the Chinese Application No. 2021105377926 filed on May 18, 2021, titled "Dual-Polarized Filtering Antenna Units, Dual-Polarized Filtering Antenna Arrays", the disclosure of which is incorporated in this application by reference in its entirety.

TECHNICAL FIELD

The present application relates to the field of antenna technology, in particular to a dual-polarized filtering antenna unit and a dual-polarized filtering antenna army.

TECHNICAL BACKGROUND

Dual-frequency dual-polarized antennas am multiple-band miniaturized, dual-polarized designs. The multiple frequency of the antennas enables the antennas to work in multiple-frequency bands at the same time, such that one multiple-frequency antenna may replace multiple single-frequency antennas, further improving the integration of the communication system to meet the needs of the 5G communication system.

At present, base station antennas are developing in the direction of broaband. The wider the bandwidth of the antenna is, the larger its size. In actual design, due to the limitation of the antenna size due to the application scenario of the antenna, it is often necessary to simplify the antenna structure in order to reduce the antenna size, which leads to narrowing of the bandwidth of the antenna.

SUMMARY OF THE INVENTION

The present application provides a dual-polarized filtering antenna unit and a dual-polarized filtering antenna army.

A first aspect of the present application relates to a dual-polarized filtering antenna unit, comprising a metal substrate and a radiating layer provided oppositely, a plurality of dielectric layers are provided between the metal substrate and the radiating layer, metal layers are provided between adjacent dielectric layers, each of the plurality of dielectric layers comprises a first via hole and a second via hole, axes of first via holes of the plurality of dielectric layers am parallel or coincident, axes of second via holes of the plurality of dielectric layers am parallel or coincident, the first via holes and the second via holes am for accommodating metal pillars, the metal pillars am for transmitting current signals;

wherein the first via holes of the adjacent dielectric layers am electrically connected through the metal layers between the adjacent dielectric layers, the second via holes of the adjacent dielectric layers are electrically connected through the metal layers between the adjacent dielectric layers, the first via hole of a first dielectric layer in the plurality of dielectric layers is electrically connected to the second via hole of a first dielectric layer through the metal substrate, the first via hole of a second dielectric layer in the plurality of dielectric layers and the second via hole of a second dielectric layer are respectively electrically connected to the radiating layer, the first dielectric layer is a dielectric layer closest to the metal substrate among the plurality of dielectric layers, the second dielectric layer is a dielectric layer closest to the radiating layer among the plurality of dielectric layers;

wherein the first via holes of each of the plurality of dielectric layers form a first sub-path, the second via holes of each of the plurality of dielectric layers form a second sub-path, the first sub-path and the second sub-path generate a resonance to form a radiation null point, thereby realizing a filtering.

A second aspect of the present application relates to a dual-polarized filtering antenna array, comprising dual-polarized filtering antenna units provided in an array, the dual-polarized filtering antenna units am the above-mentioned dual-polarized filtering antenna unit.

The details of one or more embodiments of the application are set forth in the accompanying drawings and the description below. Other features, objectives and advantages of the present application will become apparent from the description, drawings and claims.

DETAILED DESCRIPTION

Figure 1:
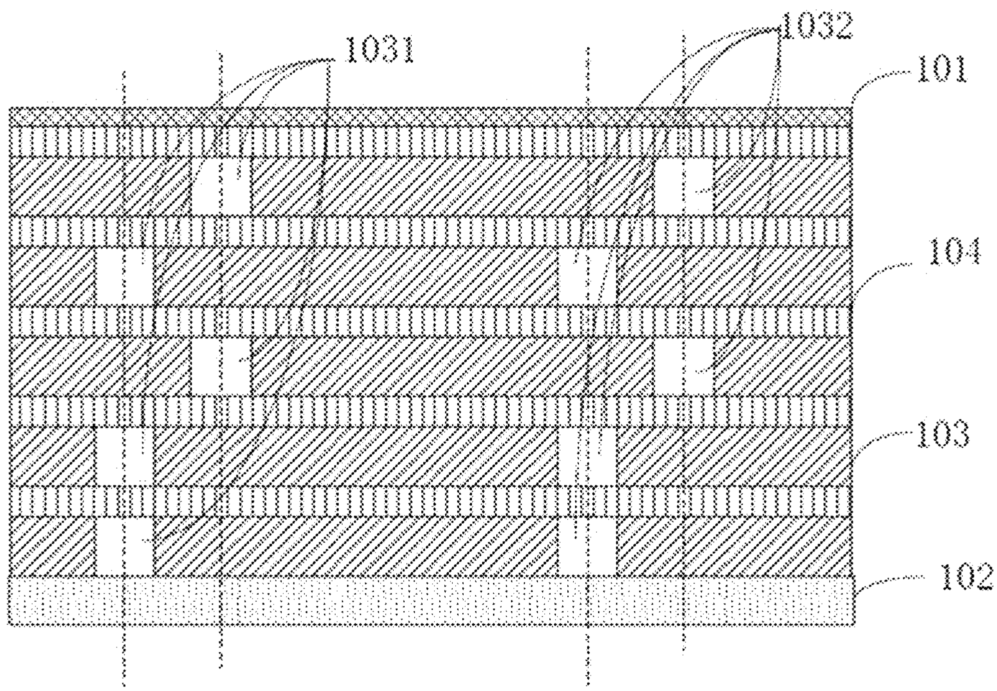
FIG. 1 is an illustrative diagram of an exploded structure of a dual-polarized filtering antenna unit provided in an embodiment of the present application.

In order to make the purposes, technical solutions and advantages of the present application more clearly understood, the present application will be described in further detail below with reference to the accompanying drawings and embodiments. It should be understood that the specific embodiments described herein are only used to explain the present application, but not to limit the present application.

With the increasing popularity of mobile communication devices, the spectrum resources in the microwave frequency band are becoming more and more crowded, resulting in narrower bandwidth that may be allocated. As a result, the signal transmission speed is affected and cannot be further improved, and it is difficult to meet people's daily demands for higher communication speed.

Based on this, the current millimeter-wave frequency band communication has attracted the attention of many experts and scholars local and abroad due to its wide available bandwidth and high information transmission rate advantages. Wherein, the antenna is an indispensable and important part of the millimeter-wave wireless communication system.

Driven by the development of 5G communication systems, antenna technology has also continued to improve, making antenna design towards miniaturization, low profile, multiple-band, multiple-polarization directions etc. Miniaturized, low-profile antennas not only may reduce manufacturing costs, but also help improving the integration of 5G systems. However, in practical design, due to the limitation of the antenna size due to the application scenario of the antenna, it is often necessary to simplify the antenna structure in order to reduce the antenna size, which leads to the narrowing of the bandwidth of the antenna.

Therefore, providing a dual-polarized antenna that not only may reduce the antenna size but also ensure the antenna bandwidth has become a key research topic in this field.

In view of the shortcomings of the above-mentioned various existing technologies, an embodiment of the present application provides a dual-polarized filtering antenna unit. The dual-polarized filtering antenna unit comprises a metal substrate and a radiating layer. A plurality of dielectric layers are provided between the metal substrate and the radiating layer, each of which is provided with a first via hole and a second via hole, wherein the first via hole and the second via hole are for accommodating metal pillars. The metal pillars are for transmitting current signals. Axes of the first via holes of the plurality of dielectric layers are parallel or coincident. The first via holes of the adjacent dielectric layers are electrically connected through the metal layers between the adjacent dielectric layers. In this way, when the current signal is transmitted between the metal substrate and the radiating layer, the flow path of the current signal is longer than that in the prior art, thereby realizing a low profile and reducing the size of the antenna. By loading the first via hole and the second via hole, the bandwidth of the antenna is expanded, and the purpose of antenna miniaturization and multiple-band design is realized.

Please refer to FIG. 1, which shows a dual-polarized filtering antenna unit provided by an embodiment of the present application. The dual-polarized filtering antenna unit comprises a metal substrate 102 and a radiating layer 101 provided oppositely. A plurality of dielectric layers 103 are provided between the metal substrate 102 and the radiating layer 101. Metal layers 104 are provided between adjacent dielectric layers 103.

Wherein, each dielectric layer 103 comprises a first via hole 1031 and a second via hole 1032. Both the first via hole 1031 and the second via hole 1032 penetrate the dielectric layer in the thickness direction of the dielectric layer 103. Wherein, via holes are also called metallized via holes. In double-sided and multiple-layer boards, in order to connect the printed wires between the layers, a common hole is drilled at an intersection of the wires that need to be connected in each layer. In this embodiment of the present application, the first via holes 1031 and the second via holes 1032 are used to accommodate metal pillars. The metal pillars are used to transmit current signals. The first via holes of the dielectric layers are electrically connected through the metal layer 104 between a dielectric layer and the adjacent dielectric layer, and the second via holes of the dielectric layers am electrically connected to the metal layer 104 between a dielectric layer and the adjacent dielectric layer.

As shown in FIG. 1, the dotted lines represent the axes of the first via holes 1031 and the second via holes 1032. The axes of the first via holes 1031 of the plurality of dielectric layers are parallel and spaced apart by a preset distance. The axes of the second via holes 1032 of the plurality of dielectric layers are parallel and spaced apart by a preset distance. In this specification, the axes of the via holes refer to virtual straight lines where the hole axes of the holes are located.

Figure 2:
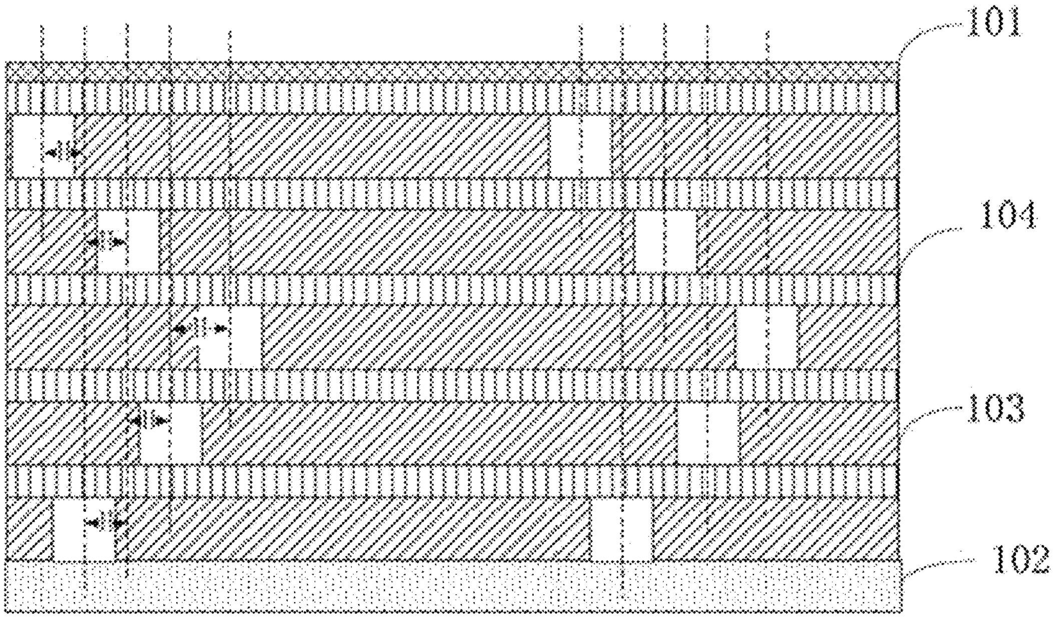
FIG. 2 is an illustrative diagram of an exploded structure of another dual-polarized filtering antenna unit provided in an embodiment of the present application.

Optionally, as shown in FIG. 2, among the plurality of dielectric layers, the axes of the first via hole of each dielectric layer am spaced apart by a preset distance from the axes of the first via holes of the adjacent dielectric layers. The axes of the second via holes of each dielectric layer are spaced apart by a preset distance from the axes of the second via holes of the adjacent dielectric layers.

Figure 3:
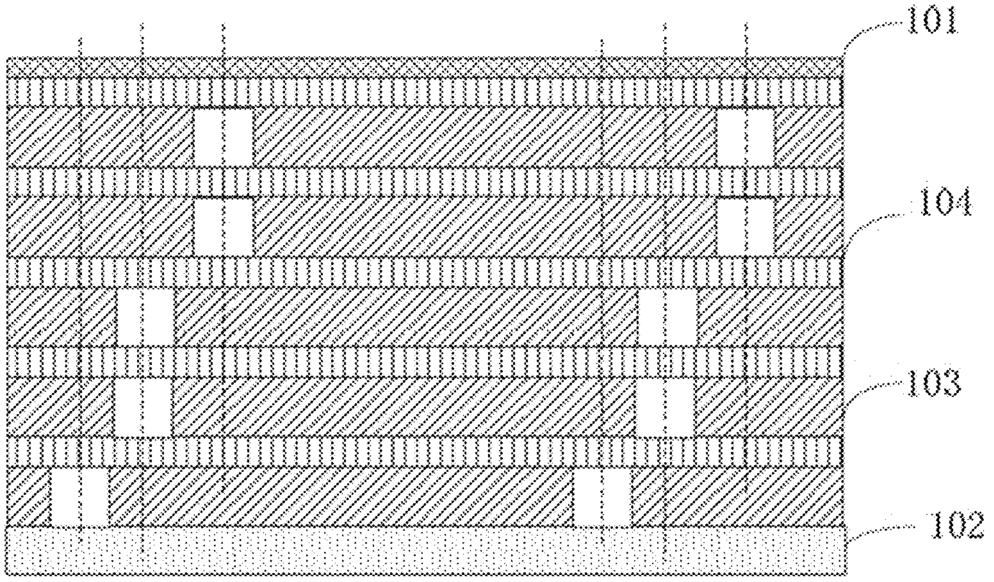
FIG. 3 is an illustrative diagram of an exploded structure of another dual-polarized filtering antenna unit provided in an embodiment of the present application.

Optionally, as shown in FIG. 3, among the plurality of dielectric layers, the axes of the first via holes of a portion of adjacent dielectric layers coincide, and are parallel to and spaced apart by a preset distance from the axes of the first via holes of the remaining adjacent dielectric layers. The axes of the second via holes of a portion of adjacent dielectric layers coincide, and are spaced apart by a preset distance from the axes of the second via holes of the remaining dielectric layers. Wherein, adjacent dielectric layers represent the two closest dielectric layers in the dual-polarized filtering antenna unit. For example, in FIGS. 1 to 6, adjacent dielectric layers may represent two adjacent dielectric layers neighbouring above and below.

Figure 4:
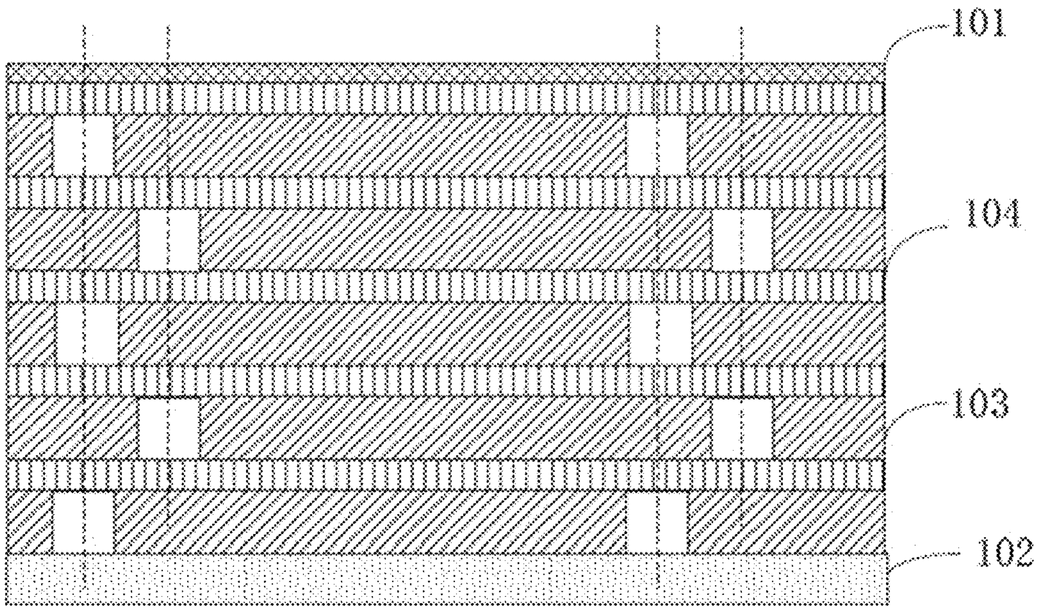
FIG. 4 is an illustrative diagram of an exploded structure of another dual-polarized filtering antenna unit provided in an embodiment of the present application.

Optionally, as shown in FIG. 4, among the plurality of dielectric layers, the axes of the first via holes of two adjacent dielectric layers are spaced apart by a preset distance. In the plurality of dielectric layers, the axes of the second via holes of two adjacent dielectric layers are spaced apart by a preset distance. The axis of the first via hole of any dielectric layer coincides with the axis of the first via hole of the second adjacent dielectric layer. The axis of the second via hole of any dielectric layer coincides with the axis of the second via hole of the second adjacent dielectric layer.

Optionally, as shown in FIG. 2, the preset distance H between the axes of the first via holes 1031 of the plurality dielectric layers may be the same or different. The preset distance H between the axes of the second via holes 1032 of the plurality of dielectric layers may be the same or different.

Figure 5:
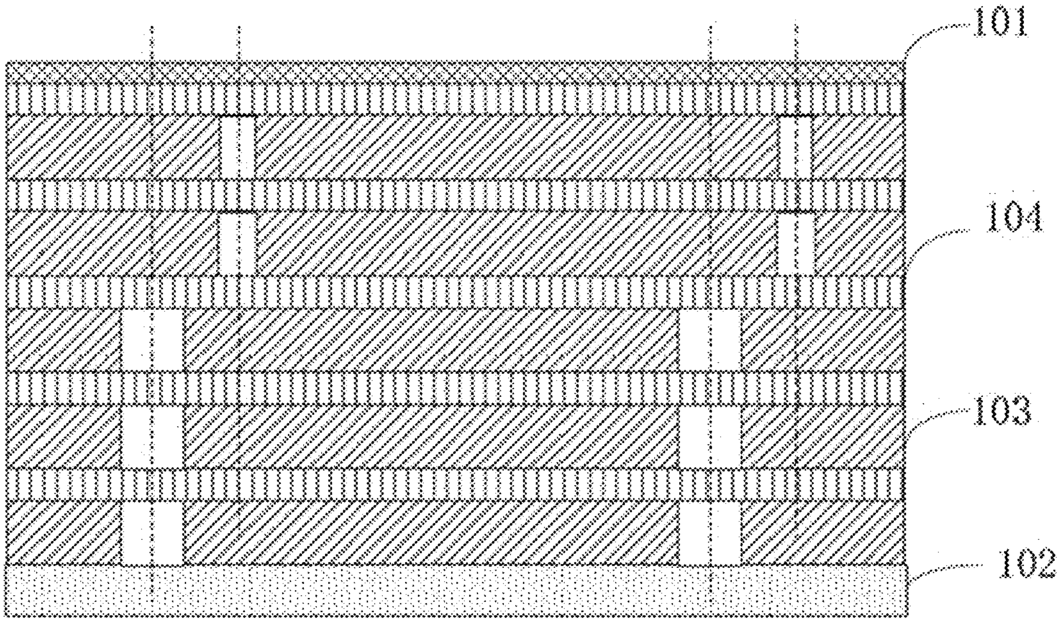
FIG. 5 is an illustrative diagram of an exploded structure of another dual-polarized filtering antenna unit provided in an embodiment of the present application.

Optionally, as shown in FIG. 5, the hole diameters of the first via hole and the second via hole in the same dielectric layer are the same, and the relative positional relationship between the first via hole in the same dielectric layer and the first via hole in the adjacent dielectric layer is the same as the relative positional relationship between the second via hole in the dielectric layer and the second via hole in the adjacent dielectric layer.

Optionally, in this embodiment of the present application, as shown in FIG. 5 and FIG. 2, the diameters of the first via holes (or second via holes) in adjacent dielectric layers may be the same or different. Optionally, an embodiment of the present application provides a dual-polarized filtering antenna unit. The dual-polarized filtering antenna unit comprises M dielectric layers 103, wherein diameters of the first via holes 1301 of N dielectric layers 103 close to the metal substrate am larger than diameters of the first via holes 1301 of M-N dielectric layers far from the metal substrate 102; diameters of the second via holes 1302 of the N dielectric layers 103 close to the metal substrate are larger than diameters of the second via holes 1302 of the M-N dielectric layers far from the metal substrate 102, M, N am integers, N is less than M.

In the embodiment of the present application, the first via hole of the first dielectric layer in the plurality of dielectric layers is electrically connected with the second via hole of the first dielectric layer through the metal substrate. The first via hole of the second dielectric layer and the second via hole of the second dielectric layer in the plurality of dielectric layers am respectively electrically connected to the radiating layer. The first dielectric layer is the dielectric layer closest to the metal substrate among the plurality of dielectric layers. The second dielectric layer is the dielectric layer closest to the radiating layer among the plurality of dielectric layers.

Figure 6:
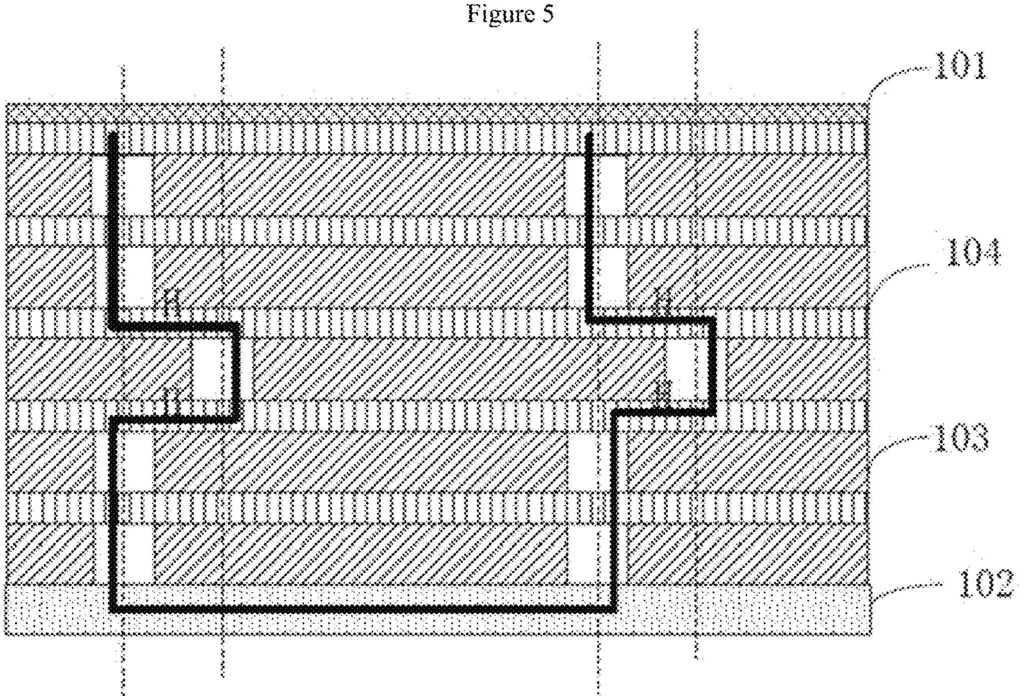
FIG. 6 is an illustrative diagram of a signal path of a dual-polarized filtering antenna unit provided in an embodiment of the present application.

Wherein, as shown in FIG. 6, the thick solid line in FIG. 6 shows a signal path formed by the metal pillars accommodated in the first via holes of the dielectric layers, the metal layers between adjacent dielectric layers, and the metal pillars accommodated in the second via holes of the dielectric layers. The path length of the signal path is longer than that in the usual dual-polarized filtering antenna unit. Therefore, when the size of the antenna unit is the same, the bandwidth of the signal path provided by the present application is wider, that is, when the bandwidth is kept unchanged, the size of the antenna unit provided by the embodiment of the present application may be reduced.

In an embodiment of the present application, the length of the signal path formed by the first via holes and the second via holes of the plurality of dielectric layers is the same as the half wavelength of the signal to be filtered out of the dual-polarized filtering antenna unit.

Wherein, the length of the signal path formed by the first via holes and the second via holes of the plurality of dielectric layers is determined by the vertical height of the metal pillars accommodated in the first via holes of the plurality of dielectric layers and the spacing distance between the axes of the first via holes of the plurality of dielectric layers. Wherein, the vertical height of the metal pillars is limited by the influence of the hardware size of the antenna, so it is not easy to change, and the spacing distance between the axes of the first via holes of the plurality of dielectric layers is adjustable. As shown in FIG. 6, the thick solid line in FIG. 6 is also used to represent the transmission path of the current signal, wherein the distance H between the axes of the first via holes of the plurality of dielectric layers may affect the length of the signal paths formed by the first via holes and the second via holes of the plurality of dielectric layers.

Figure 7:
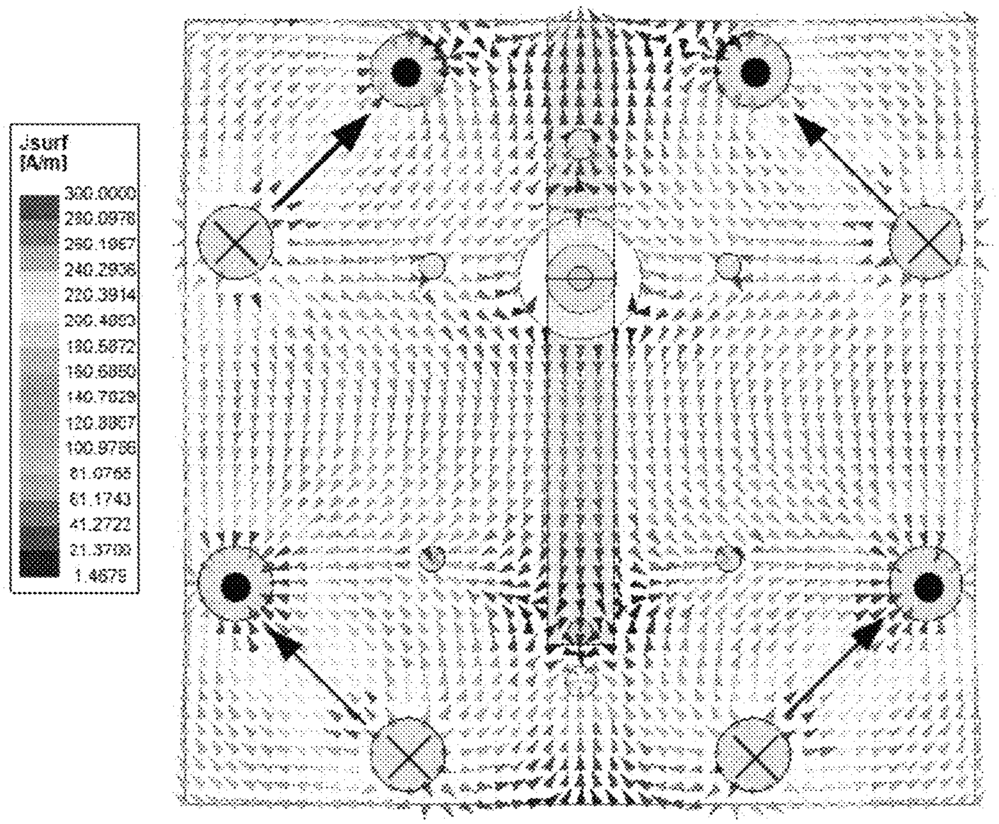
FIG. 7 is an illustrative diagram of an electric field cancellation of a dual-polarized filtering antenna unit provided in an embodiment of the present application.

In the embodiments of the present application, for the convenience of description, the signal path formed by the first via holes of the plurality of dielectric layers is defined as the first sub-path. The signal path formed by the second via holes of the plurality of dielectric layers is defined as the second sub-path. The first sub-path and the second sub-path are electrically connected through the metal substrate. Wherein, as shown in FIG. 7, for example, the current signal flows in from the first sub-path, represented by a cross, and flows out from the second sub-path, represented by a dot. At this time, the first sub-path and the second sub-path will cause resonance. A new radiation pattern is generated at low frequencies, and the operating frequency band of the antenna is shifted to low frequencies. At the same time, the resonance of the first sub-path and the second sub-path will form a radiation null point. In this case, the signal cannot be radiated out and thus is filtered out. Wherein, the half wavelength of the filtered signal is equal to the length of the signal path formed by the first via holes and the second via holes of the plurality of dielectric layers.

Figure 8:
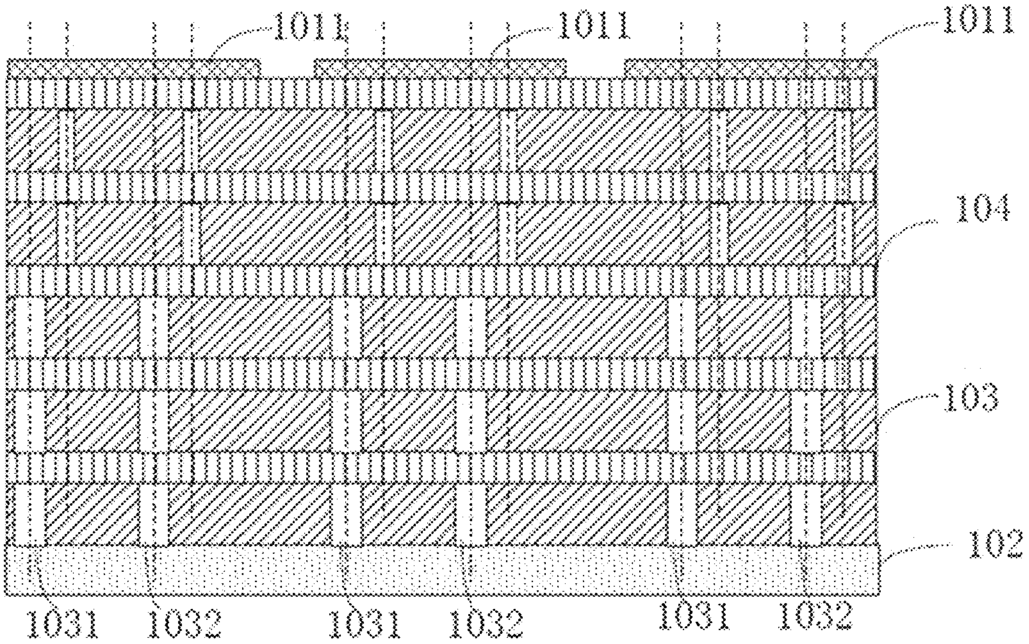
FIG. 8 is an illustrative diagram of an exploded structure of another dual-polarized filtering antenna unit provided in an embodiment of the present application.

In an embodiment of the present application, as shown in FIG. 8, the radiating layer 101 comprises a plurality of radiating sheets 1011. The plurality of radiating sheets 1011 are provided spaced apart. First via holes 1031 and second via holes 1032 are provided in each area where the dielectric layers corresponding to each radiating sheet 1011. The areas where the dielectric layers correspond to the radiating sheets refer to the areas of the dielectric layers covered by the orthographic projection of the radiating sheets onto the dielectric layers.

Optionally, each dielectric layer comprises a plurality via hole groups. Each via hole group comprises a first via hole and a second via hole. All via holes in each via group am in the area covered by the orthographic projection of the same radiating sheet onto the dielectric layers. The first via hole and the second via hole in the same via hole group of the first dielectric layer among the plurality of dielectric layers are electrically connected through the metal substrate.

Optionally, the shape of the radiating layer may be circular, rectangular, triangular or fan-shaped.

Optionally, a plurality of radiating layers may be provided in a matrix.

Optionally, in the areas corresponding to the same radiating sheet, the length of the signal path formed by the first via holes and the second via holes in the plurality of dielectric layers is the same as the half wavelength of the signal to be filtered out of the dual-polarized filtering antenna unit. The areas corresponding to a radiating sheet refers to the areas of each layer covered by the orthographic projection of the radiating sheet onto each layer of the dual-polarized filtering antenna unit.

Figure 9:
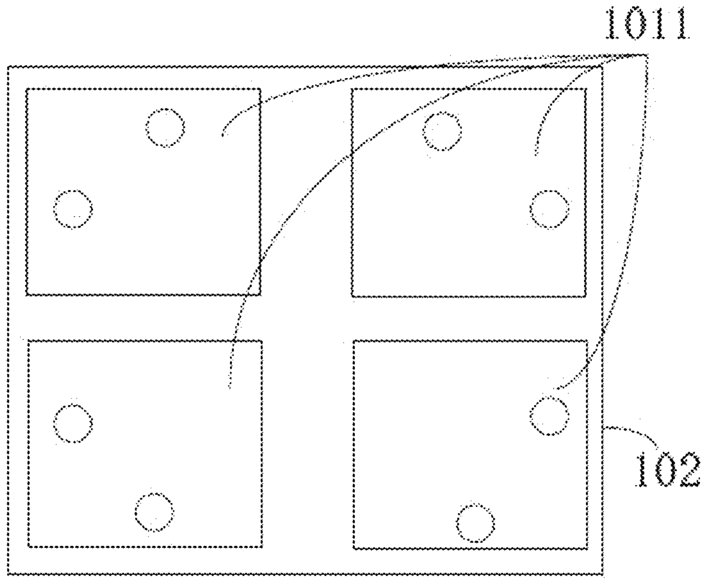
FIG. 9 is an illustrative structural diagram of a radiating layer of a dual-polarized filtering antenna unit provided in an embodiment of the present application.

Optionally, as shown in FIG. 9, the radiating layer 101 comprises four radiating sheets 1011. Each radiating sheet is respectively located in four quadrants with the center of the metal substrate as an origin point.

This application does not use an additional filter circuit structure. By loading a plurality of first via holes and second via holes in the four quadrants of the metal substrate respectively, the four quadrants are combined to generate resonance. The current is concentrated into the four quadrants. The electric fields of each other cancel each other, thereby generating a radiation null point in the stop band, so that the antenna forms a band-stop filtering effect.

In an embodiment of the present application, the area corresponding to the reserved area between each dielectric layer and the adjacent radiating sheet is provided with electric feed holes. The electric feed holes am for accommodating metal pillars. Metal pillars am for transmitting current signals. The axes of the electric feed holes of the plurality dielectric layers are coincident, wherein the electric feed holes of the first dielectric layer are connected to the first feed line, the electric feed holes of the second dielectric layer am connected to the second feed line.

Figure 10:
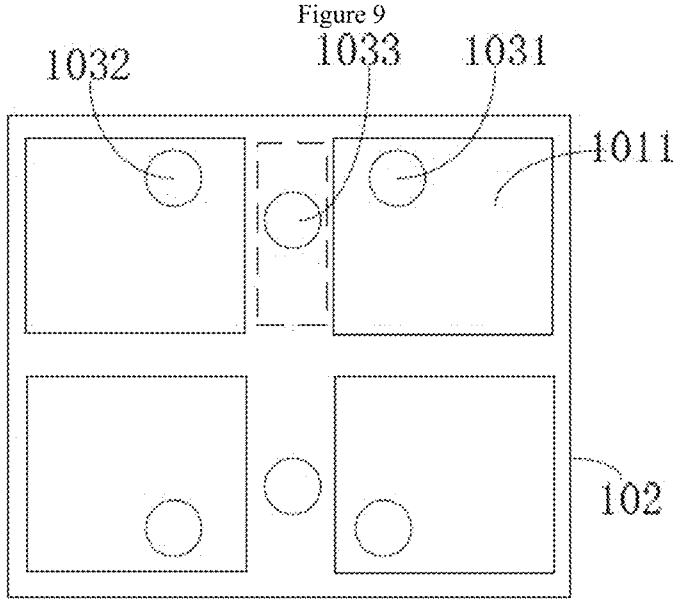
FIG. 10 is an illustrative diagram of an exploded structure of another dual-polarized filtering antenna unit provided in an embodiment of the present application.

In an embodiment of the present application, as shown in FIG. 10, the radiating layer 101 comprises a plurality of radiating sheets 1011. A reserved area is provided between adjacent radiating sheets, and the reserved area is shown as a dotted box in FIG. 10. The first via hole 1031 and the second via hole 1032 are respectively provided corresponding to the two radiating sheets, that is, the first via hole of each dielectric layer is provided in the area corresponding to the first radiating sheet among the two radiating sheets, and the second via hole of each dielectric layer is provided in the area corresponding to the second radiating sheet among the two radiating sheets.

Wherein, the areas corresponding to the reserved areas between the plurality of dielectric layers and the adjacent two radiating sheets am provided with third via holes 1033, and the axes of the third via holes 1033 of the plurality of dielectric layers am parallel and spaced apart at a preset distance. The third via holes 1033 are for accommodating a metal pillar, and the third via holes 1033 of the first dielectric layer am respectively electrically connected to the first via hole 1031 of the first dielectric layer and the second via hole 1032 of the first dielectric layer through the metal substrate. The third via holes 1033 of the adjacent dielectric layers am electrically connected through the metal layers between the adjacent dielectric layers.

Optionally, the plurality of dielectric layers comprise target dielectric layers and non-target dielectric layers, the target dielectric layers of the plurality of dielectric layers comprises third via holes, and the non-target dielectric layers do not comprise third via holes. Wherein, the target dielectric layers comprise a first dielectric layer. Optionally, the target dielectric layers are a plurality of adjacent dielectric layers. In other words, the third via holes may be provided only in target dielectric layers.

Optionally, the third via hole is located on the symmetry line of the two adjacent radiating sheets. Optionally, in this embodiment of the present application, for convenience of description, the signal path formed by the third via holes of the plurality of dielectric layers is defined below as the third sub-path. The signal path formed by the first via holes of the plurality of dielectric layers is defined as the first sub-path. The signal path formed by the second via holes of the plurality of dielectric layers is defined as the second sub-path, and the third sub-path is electrically connected to the first sub-path and the second sub-path respectively through the metal substrate.

Figure 11:
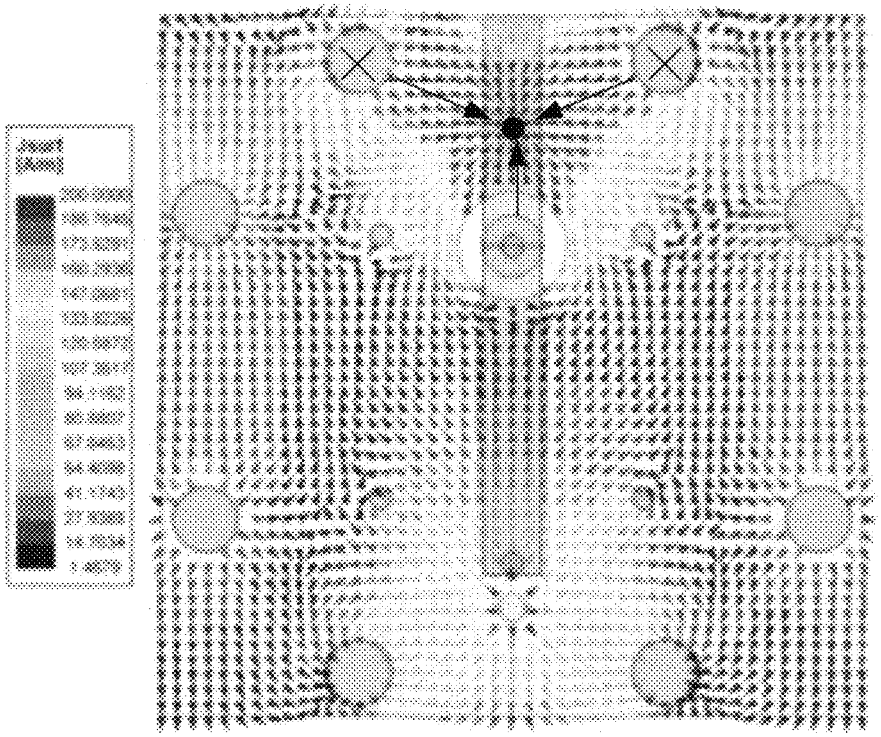
FIG. 11 is an illustrative diagram of an electric field cancellation of another dual-polarized filtering antenna unit provided in an embodiment of the present application.

Wherein, as shown in FIG. 11, the first sub-path, the second sub-path and the third sub-path interact with each other to generate two radiation null points at the edge of the high-frequency passband, so that the high-frequency passband of the antenna has a good bandpass filtering effect.

Figure 12:
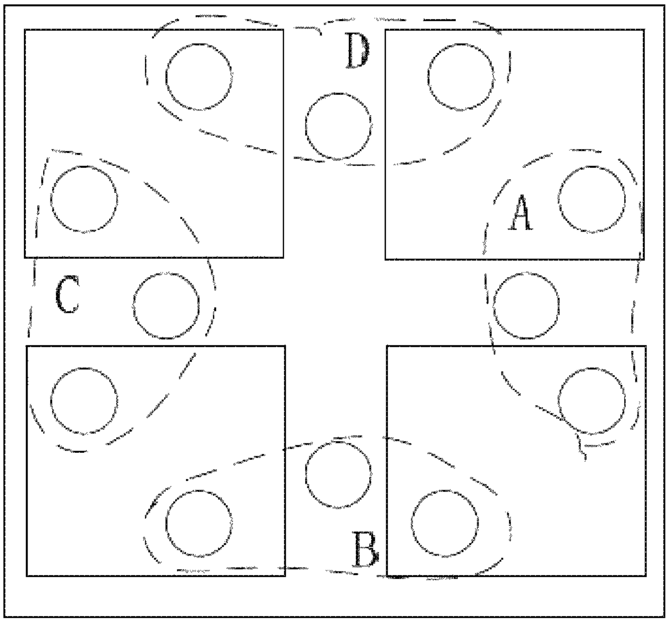
FIG. 12 is an illustrative diagram of an exploded structure of another dual-polarized filtering antenna unit provided in an embodiment of the present application.

Optionally, the radiating layer comprises four radiating sheets, and each radiating sheet is respectively located in four quadrants with the center of the metal substrate as the origin point. Third via holes am provided in the area corresponding to the reserved area between the plurality of dielectric layers and the adjacent two radiating sheets. As shown in FIG. 12, it shows the combination of AB/C/D four groups of via hole groups. In a dielectric layer, the combination of each via group comprises a first via hole, a second via hole and a third via hole, wherein the first via hole and the second via hole are respectively located in areas corresponding to adjacent radiating sheets, and the third via hole is located between the first via hole and the second via hole. Optionally, the sum of the path lengths from the third sub-path to the first sub-path and to the second sub-path in the combination of each via hole group may be the same or different.

When the half wavelength of the signal is the same as the sum of the path lengths corresponding to any combination of the four groups, the signal may be filtered out.

Figure 13:
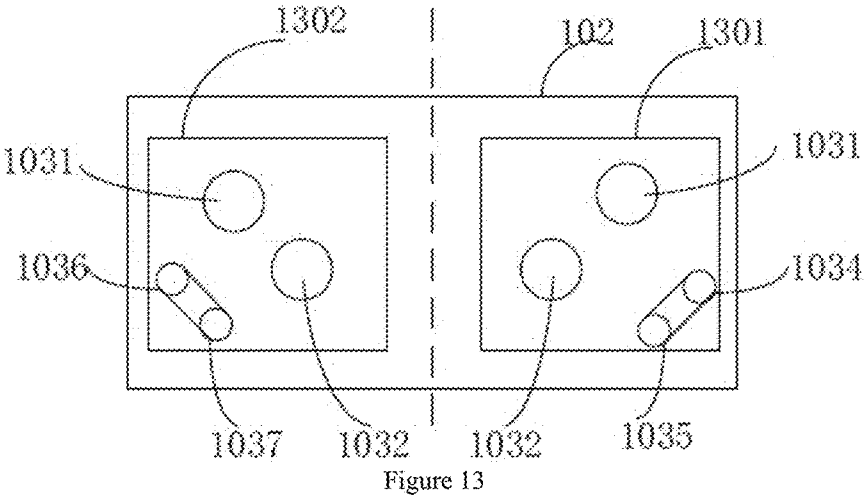
FIG. 13 is an illustrative diagram of an exploded structure of another dual-polarized filtering antenna unit provided in an embodiment of the present application.

In an embodiment of the present application, as shown in FIG. 13, the radiating layer 101 comprises a first radiating sheet 1301 and a second radiating sheet 1302, and the first radiating sheet 1301 and the second radiating sheet 1302 are provided on two sides of the symmetry line of the metal substrate.

Wherein, under the premise that the plurality dielectric layers are provided with first via holes 1031 and second via holes 1032 in the areas corresponding to the first radiating sheet 1301 and the second radiating sheet 1302, fourth via holes 1034 and fifth via holes 1035 are provided in the areas of the plurality of dielectric layers corresponding to the first radiating sheet 1301. The fourth via holes 1034 are connected with the fifth via holes 1035. The axes of the fourth via holes 1034 of the plurality of dielectric layers am parallel and spaced apart by a preset distance. The axes of the fifth via holes 1035 of each dielectric layer are parallel and spaced apart by a preset distance. The fourth via holes 1034 and the fifth via holes 1035 are for accommodating metal pillars. The fourth via holes 1034 of the adjacent dielectric layers am electrically connected through the metal layers between the adjacent dielectric layers, and the fifth via holes 1035 of the adjacent dielectric layers am electrically connected through the metal layers between the adjacent dielectric layers.

Sixth via holes 1036 and seventh via holes 1037 are provided in the areas corresponding to the second radiating sheet of the plurality of dielectric layers. The sixth via holes 1036 and the seventh via holes 1037 are connected. Axes of the sixth via holes 1036 of the plurality of dielectric layers are parallel and spaced apart by a preset distance. Axes of the seventh via holes of the plurality of dielectric layers am parallel and spaced apart by a preset distance. The sixth via holes 1036 and the seventh via holes 1037 are for accommodating metal pillars. Wherein, the fourth via hole 1034 of the first dielectric layer in the plurality of dielectric layers is electrically connected to the sixth via hole 1036 or the seventh via hole 1037 through the metal substrate. The fifth via hole 1035 of the first dielectric layer in the plurality of dielectric layers is electrically connected to the sixth via hole 1036 or the seventh via hole 1037 through the metal substrate. The sixth via holes 1036 of the adjacent dielectric layers are electrically connected through the metal layer between the adjacent dielectric layers. The seventh via holes 1037 of the adjacent dielectric layers am electrically connected through the metal layer between the adjacent dielectric layers.

Wherein, for the structures and relative relationships of the fourth via holes and the fifth via holes, and the structures and relative relationships of the sixth via holes and the seventh via holes, reference may be made to the structures and the relative relationships of the first via holes and the second via holes in the foregoing embodiment, and will not be repeated here.

Optionally, when the fourth via hole and the sixth via hole in the first dielectric layer in the plurality of dielectric layers am electrically connected through the metal substrate, the length of the signal path formed by the fourth via holes and the sixth via holes in the plurality of dielectric layers is the same as the half wavelength of the frequency of the resonance point of the low frequency passband, so as to realize the purpose of miniaturization of the antenna.

Optionally, when the fourth via hole and the seventh via hole in the first dielectric layer in the plurality of dielectric layers am electrically connected through the metal substrate, the length of the signal path formed by the fourth via holes and the seventh via holes in the plurality of dielectric layers is the same as the half wavelength of the frequency of the resonance point of the low frequency passband, so as to realize the purpose of miniaturization of the antenna.

Optionally, when the fifth via hole and the sixth via hole in the first dielectric layer in the plurality of dielectric layers am electrically connected through the metal substrate, the length of the signal path formed by the fifth via holes and the sixth via holes in the plurality of dielectric layers is the same as the half wavelength of the frequency of the resonance point of the low frequency passband, so as to realize the purpose of miniaturization of the antenna.

Optionally, when the fifth via hole and the seventh via hole in the first dielectric layer in the plurality of dielectric layers am electrically connected through the metal substrate, the length of the signal path formed by the fifth via holes and the seventh via holes in the plurality of dielectric layers is the same as the half wavelength of the frequency of the resonance point of the low frequency passband, so as to realize the purpose of miniaturization of the antenna.

In another embodiment of the present application, in the dual-polarized filtering antenna unit provided in an embodiment of the present application, the radiating layer comprises a first radiating sheet and a second radiating sheet. The first radiating sheet and the second radiating sheet are rotationally symmetrically distributed with the center of the metal substrate as the origin point.

Figure 14:
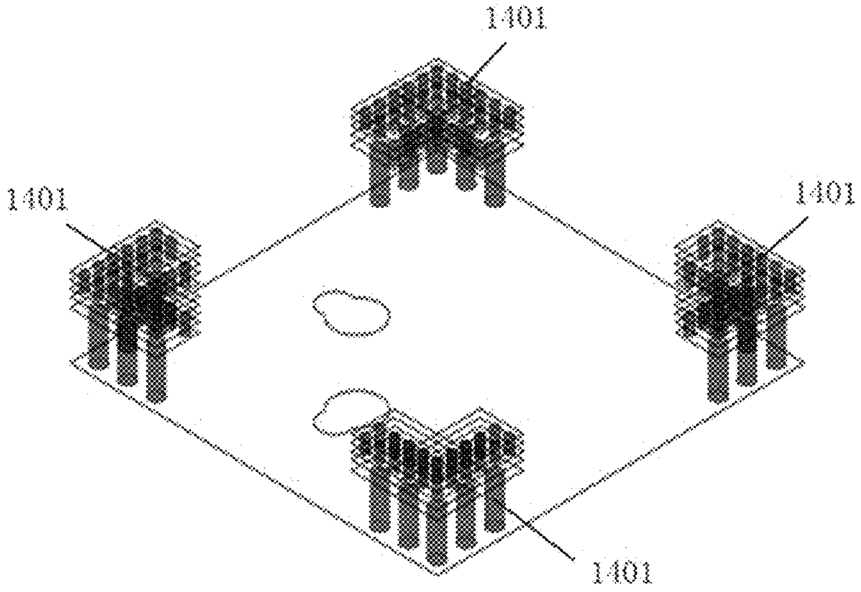
FIG. 14 is an illustrative diagram of an exploded structure of another dual-polarized filtering antenna unit provided in an embodiment of the present application.
Figure 15:
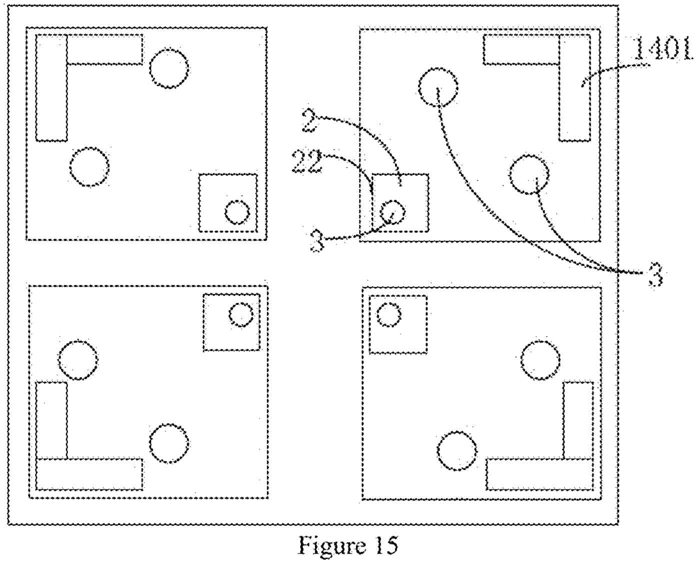
FIG. 15 is an illustrative top-view diagram of the dual-polarized filtering antenna unit shown in FIG. 14.

Wherein, as shown in FIG. 14, a plurality of first shorting pillar structures 1401 connected to each other are provided in a plurality of dielectric layers in the areas corresponding to the first radiating sheet. An illustrative top-view diagram of the plurality of first shorting pillar structures connected to each other is shown in FIG. 15. The first shorting pillar structure comprises first adjustment via holes provided in each dielectric layer. The first adjustment via holes am used for accommodating metal pillars. The metal pillars am used for transmitting current signals. The first adjustment via holes of the adjacent dielectric layers are electrically connected through the metal layers between the adjacent dielectric layers.

The plurality of dielectric layers are provided with a plurality of second shorting pillar structures connected to each other in the areas corresponding to the second radiating sheet. The second shorting pillar structures comprise second adjustment via holes provided in each dielectric layer. The second adjustment via holes am for accommodating metal pillars. The metal pillar is for transmitting the current signals. The second adjustment via holes of the adjacent dielectric layers am electrically connected through the metal layers between the adjacent dielectric layers. Wherein, the plurality of first shorting pillar structures connected to each other and the plurality of second shorting pillar structures connected to each other may be equivalent to metal walls.

Optionally, the axes of the adjustment via holes of the plurality of dielectric layers may be coincident.

Optionally, the axes of the adjustment via holes of the plurality of dielectric layers am parallel and spaced apart by a preset distance.

Wherein, the currant signal flows from the plurality of shorting pillar structures corresponding to the first radiating sheet to the plurality of shorting pillar structures corresponding to the second radiating sheet through the metal substrate, and generates resonance, thereby generating a new radiation pattern at low frequencies, which greatly widens the antenna bandwidth; the length of the signal path formed by the two shorting pillar structures that generate resonance and the metal substrate is half of the wavelength corresponding to the frequency of the resonance point.

Optionally, in this embodiment of the present application, the first via holes in the areas corresponding to the first radiating sheet in the plurality of dielectric layers form the first sub-signal path. The second via holes in the areas corresponding to the first radiating sheet in the plurality of dielectric layers form the second sub-signal path. The metal walls in the areas corresponding to the first radiating sheet in the plurality of dielectric layers form a third sub-signal path. The first sub-signal path, the second sub-signal path and the third sub-signal path interact to generate resonance, thereby forming a radiation null point, so that the antenna has a good band-stop filtering effect.

In an optional implementation manner, as shown in FIG. 14 and FIG. 15, the radiating layer comprises four radiating sheets, and each radiating sheet is respectively located in four quadrants with the center of the metal substrate as the origin point. In addition, a plurality of adjustment via holes are respectively provided in areas of the plurality of dielectric layers corresponding to the edge areas of the four quadrants of the metal substrate. The adjustment via holes are used for accommodating metal pillars. The metal pillars are used for transmitting current signals. The plurality of adjustment via holes located in the same quadrant of the first dielectric layer are electrically connected through the metal substrate.

In an embodiment of the present application, a dual-polarized filtering antenna array is provided, the dual-polarized filtering antenna array comprises dual-polarized filtering antenna units provided in an array, and the dual-polarized filtering antenna units are the dual-polarized filtering antenna unit described in the above embodiment.

Embodiment 1

Figure 16:
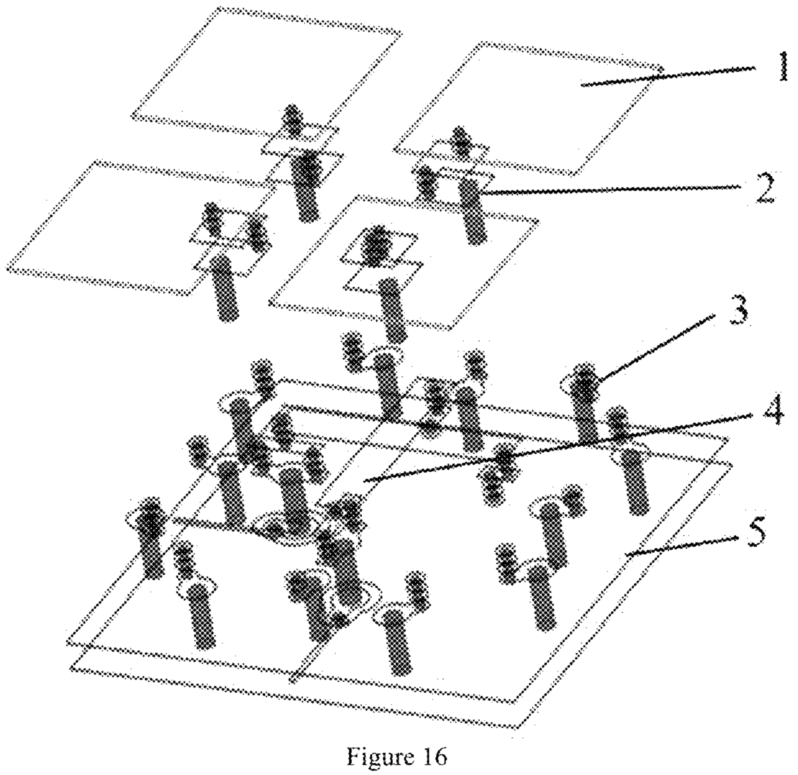
FIG. 16 is an illustrative diagram of an exploded structure of the dual-polarized filtering antenna unit in Embodiment 1 provided by an embodiment of the present application.
Figure 17:
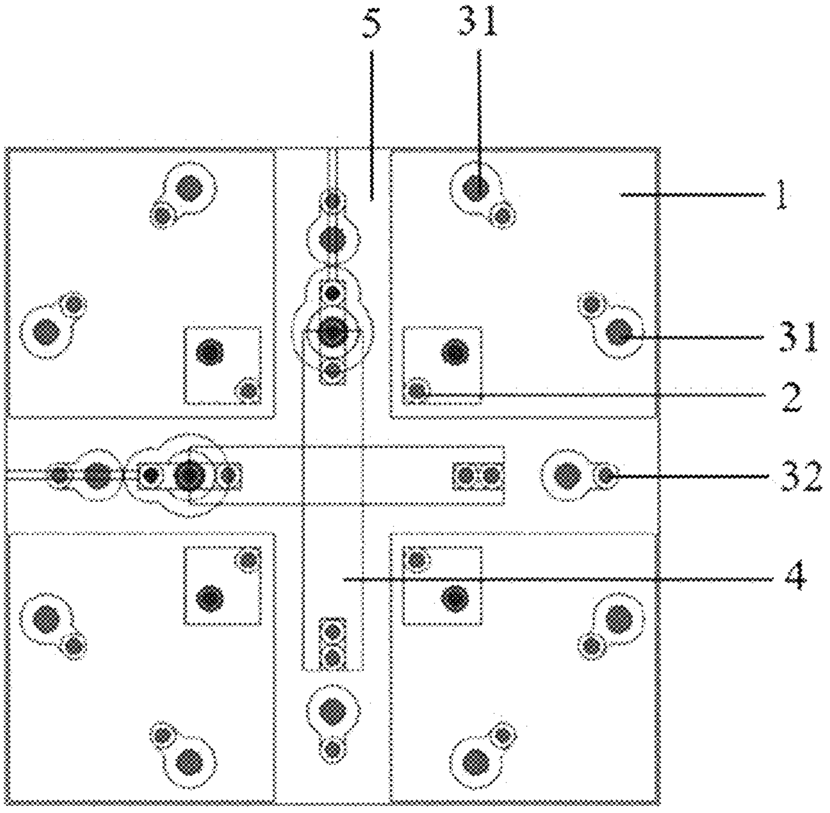
FIG. 17 is an illustrative top-view structural diagram of the dual-polarized filtering antenna unit in Embodiment 1 provided by an embodiment of the present application.

As shown in FIG. 16 and FIG. 17, it shows a miniaturized dual-frequency dual-polarized millimeter-wave filtering antenna unit, comprising an electric dipole structure 1, a magnetic dipole structure 2, metallized via holes 3, an electric feed structure 4 and metal substrate 5. A plurality of dielectric layers are provided between the electric dipole structure 1 and the metal substrate 5.

Wherein, as shown in FIG. 9, the electric dipole structure 1 comprises four radiating sheets 11. The four radiating sheets are distributed in an array. The structures of the radiating sheets are not limited to circular, rectangular, triangular, or fan-shaped.

Figure 18:
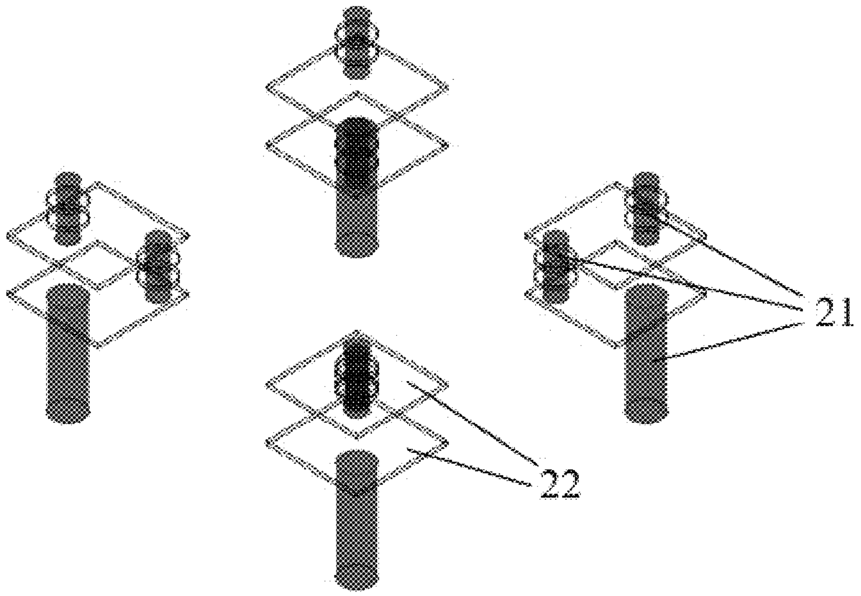
FIG. 18 is an illustrative diagram of a magnetic dipole structure in Embodiment 1 provided by an embodiment of the present application.

As shown in FIG. 15 and FIG. 18, the magnetic dipole structure 2 comprises metal strips 22. The metal strips 22 form a closed area. Metallized via holes 3 are provided in the areas corresponding to each dielectric layer and the closed area. The axes of the metallized via holes 3 are parallel and spaced apart by a preset distance. Wherein, by adjusting the relative positions of the metallized via holes 3 and the metal strips 22, the path length of the current signal may be extended, thereby realizing a low-profile design.

As shown in FIG. 18, among the plurality of dielectric layers, the hole diameter of the metallized via holes in a portion of the dielectric layers is larger than that of the metallized via holes of the other portion. Optionally, the plurality of dielectric layers comprises M dielectric layers, wherein the hole diameters of the metallized via holes of the N dielectric layers near the metal base are larger than the hole diameters of the metallized via holes of the M-N dielectric layers away from the metal substrate.

Figure 19:
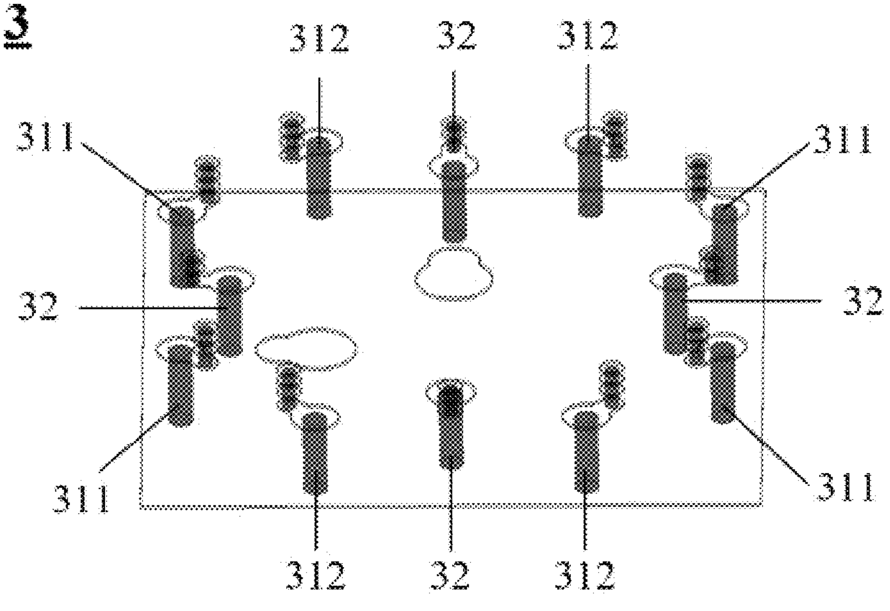
FIG. 19 is an illustrative structural diagram of metallized via holes in Embodiment 1 provided by an embodiment of the present application.

As shown in FIG. 19, in the embodiment of the present application, a plurality of pairs of first via holes 311 and second via holes 312 with a certain gap are provided on each dielectric layer, which are loaded in four quadrants of the metal substrate, and the center of the metal substrate, and distributed in rotational symmetry with the center of the metal substrate; when the antenna works in the 0° polarization direction, the first signal path formed by the first via holes 311 of the plurality of dielectric layers and the first signal path formed by the plurality of dielectric layers are set oppositely in the 0° polarization direction. The second signal path formed by the second via holes 312 causes resonance, generates a new radiation pattern at low frequencies, and moves the antenna operating frequency band to the low frequency; further, the first signal path and the second signal path work together, which not only expands the low-frequency bandwidth of the antenna, but also generates resonance to form a radiation null point, so that the antenna has a good band-stop filtering effect; further, the sum of the lengths of the paths of the first signal path, the second signal path and the current signal on the intermediate metal substrate is the half wavelength length corresponding to the radiation null point; when the antenna works in the 90° polarization direction, the two operating modes are reciprocal.

As shown in FIG. 18, two pairs of orthogonal third via holes 32 are loaded in each dielectric layer in two polarization directions with the center of the metal substrate as the origin point; when the antenna works in the 0° polarization direction, relatively set in the 0° polarization direction, the third signal path formed by the third via holes 32 of a plurality of dielectric layers interacts with the adjacent first signal path and the second signal path. The third signal path resonates with the first signal path and the second signal path, and two radiation null points am generated at the edge of the high-frequency passband, so that the high-frequency passband of the antenna has a good band-pass filtering effect; when the antenna works in the 90° polarization direction, the two operating modes are reciprocal.

Figure 20:
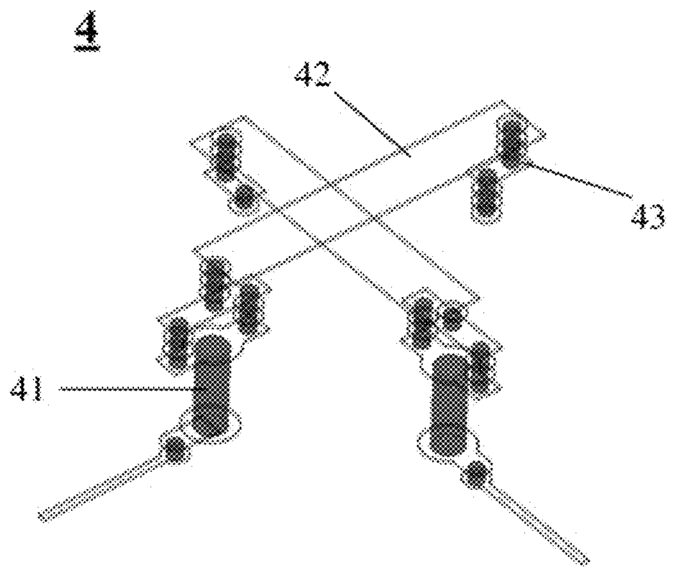
FIG. 20 is an illustrative diagram of an electric feed structure in Embodiment 1 provided by an embodiment of the present application.

As shown in FIG. 20, the two orthogonally placed horizontal electric feed 42 are located in different stacks to achieve higher polarization isolation. It should be noted that if the lower horizontal electric feed line is raised, the impedance matching of the antenna in this polarization direction will be better, but the polarization isolation of the antenna will be worse. In order to keep the antenna polarization isolation and matching within the acceptable range, the distance between two horizontal electric feed here is selected to be 0.1 mm.

In the embodiment of the present application, the multiple-layer HDI process design is adopted. The antenna has strong stability, and the size of the antenna unit is 3.2 mm*3.2 mm*0.84 mm, which realizes the miniaturized design of the antenna.

Figure 21:
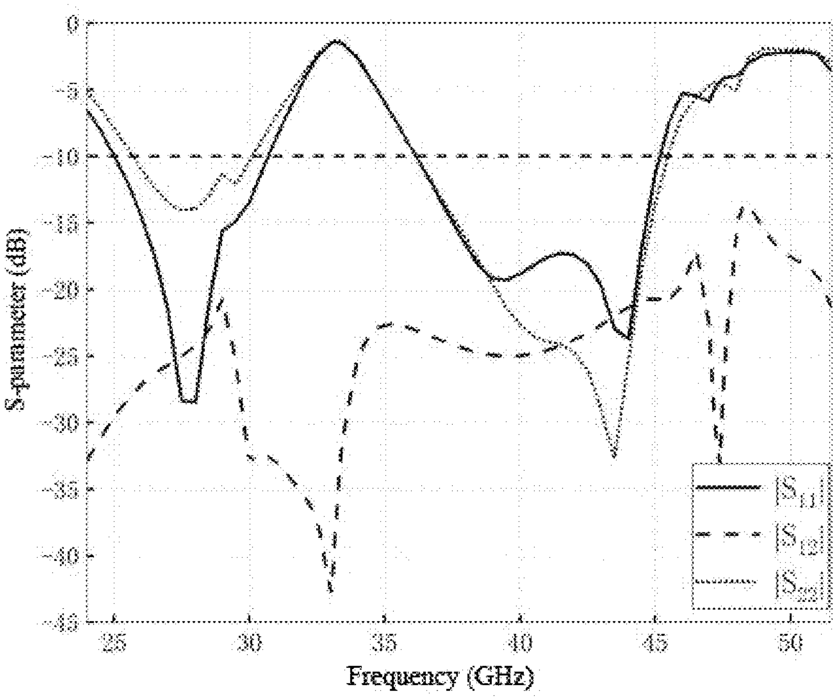
FIG. 21 is a simulation result diagram of the return loss and polarization isolation curve in Embodiment 1 provided by an embodiment of the present application.

As shown in FIG. 21, it is an S-parameter diagram of a miniaturized dual-frequency dual-polarized millimeter-wave filtering antenna provided by an embodiment of the present application. It may be seen from the figure that the impedance matching of the two ports of the antenna is at 25.7-30 GHz, 36.2-45 GHz, covering the n257, n259 and n260 frequency bands that am currently used more frequently. The return losses am all below −10 dB. The polarization isolation is always maintained above 20 dB in the dual-band passband.

Figure 22:
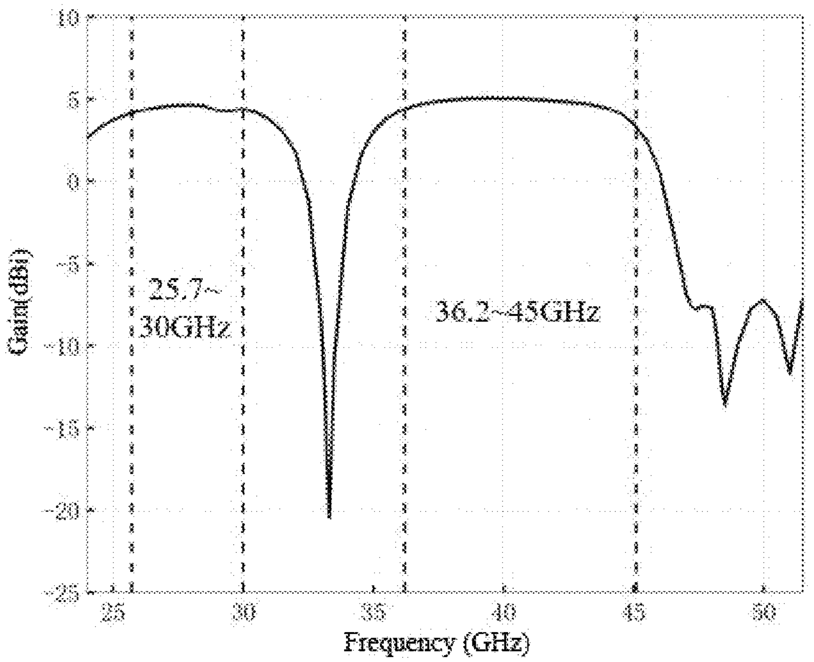
FIG. 22 is a simulation result diagram of the gain curve in Embodiment 1 provided by an embodiment of the present application.

As shown in FIG. 22, it is a gain curve diagram of a miniaturized dual-frequency dual-polarized millimeter-wave filtering antenna provided by an embodiment of the present application. It may be seen from the figure that the gain is stable in the dual-frequency passband. Due to the introduction of two radiation null points at the edge of the high-frequency passband, the gain at the edge of the high-frequency passband is reduced. However, in the 26.5-29.5 GHz and 37-43.5 GHz frequency bands currently used by 5G, the antenna gain is above 4.3 dBi. If the floor size is increased to 6.5 mm, the gain may be increased to 7 dBi.

As shown in FIG. 22, the embodiment of the present application does not use an additional filter circuit structure, and three radiation null points are generated at the edge of the passband. It is mainly realized by loading the shorting pillar structures at a specific position. Under the joint action of the three null points, a good band-stop filtering effect of the antenna is achieved, and at the same time, a good band-pass filtering effect is achieved in the high-frequency passband of the antenna.

The implementation of this application has the following advantages:

(1) The structure of this application is simple. On the basis of the traditional magnetoelectric dipole antenna, the first signal path and the second signal path am formed by setting metallized via holes in the dielectric layer, and the rest of the metal substrates work together to expand the antenna bandwidth, and the antenna miniaturization and multiple-band design am realized.

(2) This application does not use an additional filter circuit structure, and the first signal path is formed in each quadrant by arranging the first via holes and the second via holes in the four quadrants of the plurality of dielectric layers and the metal substrate respectively. The first signal path and the second signal path in the four quadrants are combined to generate resonance, and the current is concentrated to the four quadrants, and the electric fields of each other cancel each other out, thereby generating a radiation null point in the stop band, so that the antenna forms a band-stop filtering effect. A pair of third via holes is respectively loaded in the plurality of dielectric layers and the two polarization directions with the center of the metal substrate as the origin point. The third signal path formed by the third via holes of the plurality of dielectric layers interacts with the first signal path and the second signal path that are closer in the four quadrants, thereby generating two radiation null points in the high-frequency passband of the antenna.

(3) This application is based on High Density Interconnector (HDI) process packaging, with low cost and high reliability.

(4) The antenna unit realizes the dual-polarized radiating characteristics with excellent performance. The antenna cross-polarization is low, the beam width is wide, and the radiation pattern is stable.

Embodiment 2

Figure 23:
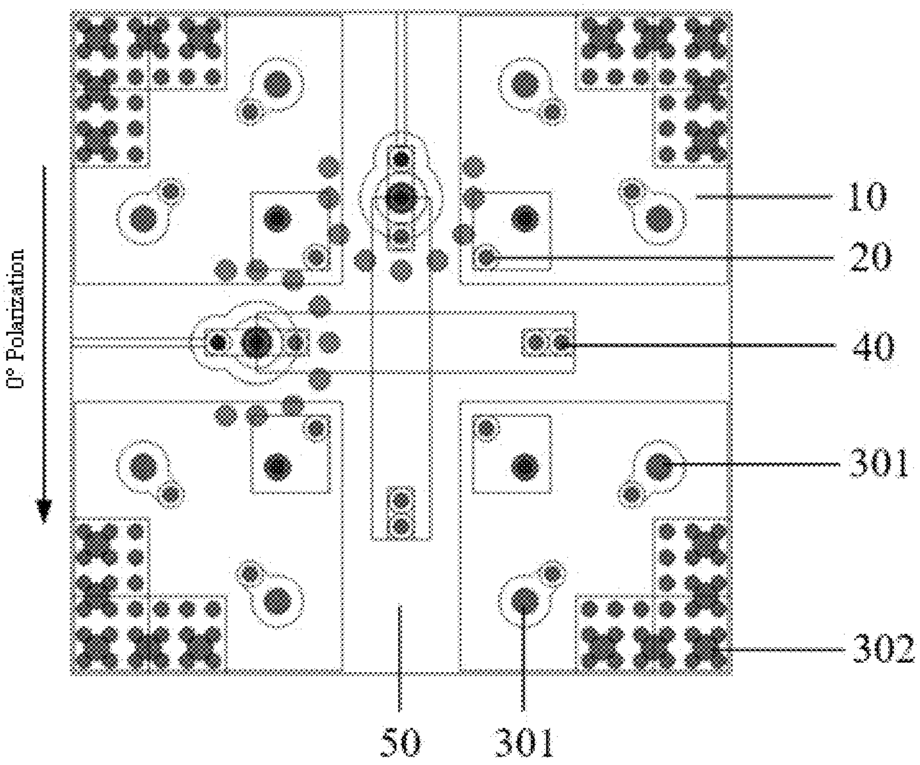
FIG. 23 is an illustrative top-view structural diagram of the dual-polarized filtering antenna unit in Embodiment 2 provided by an embodiment of the present application.

As shown in FIG. 23, this embodiment provides another miniaturized dual-frequency dual-polarized millimeter-wave filtering antenna. The antenna comprises an electric dipole structure 10, a magnetic dipole structure 20, shorting pillar structures 301 and 302, an electrical feed structure 40 and metal substrate 50.

Figure 24:
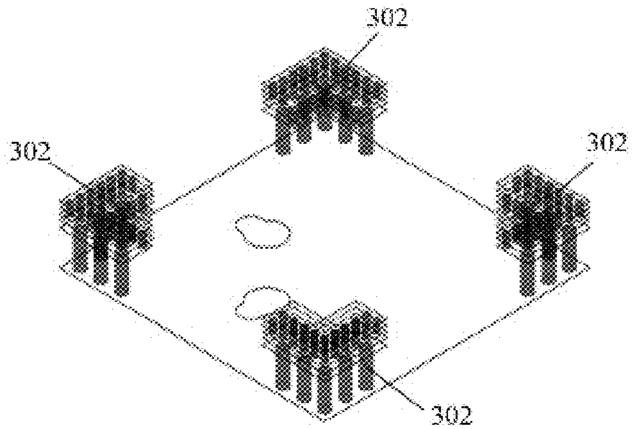
FIG. 24 is an illustrative structural diagram of metallized via holes of the dual-polarized filtering antenna unit in Embodiment 2 provided by an embodiment of the present application.

As shown in FIG. 23 and FIG. 24, the shorting pillar structure 302 comprises a plurality of shorting pillars connected to each other, which may be further equivalent to metal walls, distributed in four quadrants of the metal substrate 50, and distributed in a rotationally symmetrical manner around the center of the metal substrate. When the antenna operates in the 0° polarization direction, along the 0° polarization direction, the current flows from one side of the shorting pillar through the metal substrate to the other side of the shorting pillar, resulting in resonance, thereby generating a new radiation pattern at low frequencies, which significantly widening the antenna bandwidth; further, the length of the current path on the two shorting pillars and the metal substrate is half of the wavelength corresponding to the frequency of the resonance point. When the antenna works in the 90° polarization direction, the two operating modes are reciprocal.

As shown in FIG. 23, the shorting pillar structure 301 comprises two shorting pillars with a certain gap in each quadrant of the metal substrate, which are spaced apart from the shorting pillar 302; further, the two shorting pillars in each quadrant work together to generate resonance, thereby forming a radiation null point, so that the antenna has a good band-stop filtering effect; the sum of the current path lengths on the two shorting pillars and the intermediate metal substrate is the half-wavelength length corresponding to the radiation null point.

In this embodiment, by loading shorting pillar structures around the antenna, two pairs of shorting pillars in the same polarization direction work together to generate a new radiation pattern at low frequencies, thereby expanding the low-frequency bandwidth of the antenna and realizing the miniaturized design of the antenna.

Figure 25:
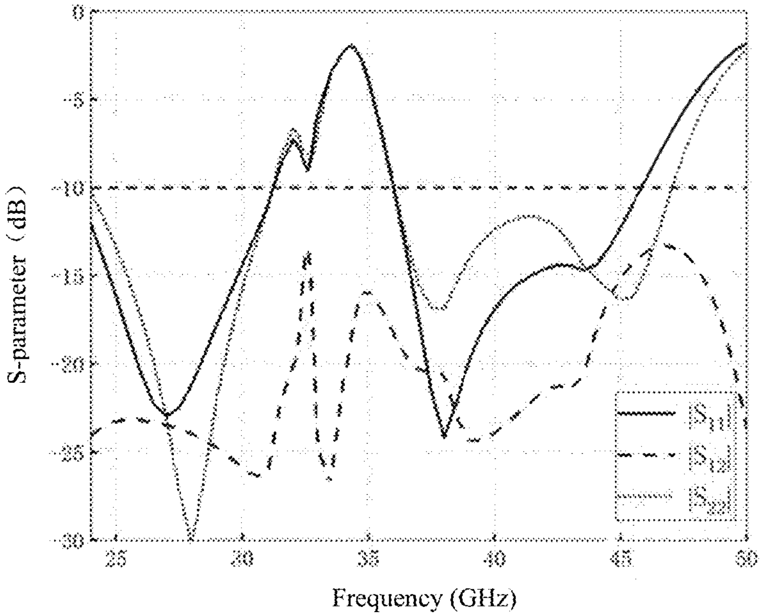
FIG. 25 is a simulation result diagram of the return loss and polarization isolation curve in Embodiment 2 provided by an embodiment of the present application.

As shown in FIG. 25, it is an S-parameter diagram of a miniaturized dual-frequency dual-polarized millimeter-wave filtering antenna provided by an embodiment of the present application. It may be seen from the figure that both ports of the antenna may cover 24-30 GHz, 37-43.5 GHz. The return loss is below −10 dB, and the antenna polarization isolation is maintained above 20 dB in these two frequency bands.

Figure 26:
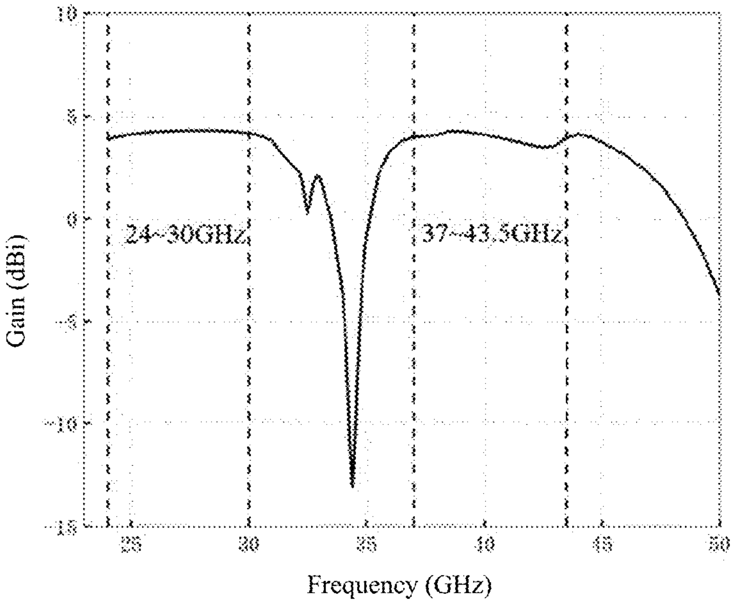
FIG. 26 is a simulation result diagram of the gain curve in Embodiment 2 provided by an embodiment of the present application.

As shown in FIG. 26, it is a gain curve diagram of a miniaturized dual-frequency dual-polarized millimeter-wave filtering antenna provided by an embodiment of the present application. It may be seen from the figure that the antenna gain is stable in the frequency band used by 5G, and the low-frequency gain remains at above 3.86 dBi. The high-frequency gain remains above 3.5 dBi. Relatively, if the antenna floor size is increased to 6.5 mm, the high-frequency gain of the antenna may reach 7 dBi; in addition, there is a radiation null point in the antenna stop band, and the null point is generated by resonance of a pair of shorting pillars 301 in each quadrant, thereby achieving a good band-stop filtering effect.

To sum up, the present application does not require an additional filter circuit structure, achieves a good band-stop filtering effect, and covers two wide frequency bands while ensuring miniaturization, and has better dual-frequency dual-polarized radiating performance.

The technical features of the above embodiments may be combined arbitrarily. For the sake of brevity, all possible combinations of the technical features in the above embodiments are not described. However, as long as there is no contradiction in the combination of these technical features, they should be considered to be within the scope of the description in this specification.

The above-mentioned embodiments only represent several embodiments of the present application, and the descriptions thereof are relatively specific and detailed, but should not be construed as a limitation on the scope of the patent application. It should be pointed out that for those skilled in the art, without departing from the concept of the present application, several modifications and improvements may be made, which all belong to the protection scope of the present application. Therefore, the scope of protection of the patent of the present application shall be subject to the appended claims.

The invention claimed is:

1. A dual-polarized filtering antenna unit, comprising a metal substrate and a radiating layer provided oppositely, a plurality of dielectric layers are provided between the metal substrate and the radiating layer, metal layers are provided between adjacent dielectric layers, each of the plurality of dielectric layers comprises a first via hole and a second via hole, axes of first via holes of the plurality of dielectric layers are parallel or coincident, axes of second via holes of the plurality of dielectric layers are parallel or coincident, the first via holes and the second via holes are for accommodating metal pillars, the metal pillars are for transmitting current signals;

wherein the first via holes of the adjacent dielectric layers are electrically connected through the metal layers between the adjacent dielectric layers, the second via holes of the adjacent dielectric layers are electrically connected through the metal layers between the adjacent dielectric layers, the first via hole of a first dielectric layer in the plurality of dielectric layers is electrically connected to the second via hole of a first dielectric layer through the metal substrate, the first via hole of a second dielectric layer in the plurality of dielectric layers and the second via hole of a second dielectric layer are respectively electrically connected to the radiating layer, the first dielectric layer is a dielectric layer closest to the metal substrate among the plurality of dielectric layers, the second dielectric layer is a dielectric layer closest to the radiating layer among the plurality of dielectric layers;

wherein the first via holes of each of the plurality of dielectric layers form a first sub-path, the second via holes of each of the plurality of dielectric layers form a second sub-path, the first sub-path and the second sub-path generate a resonance to form a radiation null point, thereby realizing a filtering.

2. The dual-polarized filtering antenna unit according to claim 1, wherein the radiating layer comprises a plurality of radiating sheets, the first via holes and the second via holes are respectively provided corresponding to two of the plurality of radiating sheets, areas corresponding to reserved areas between the plurality of dielectric layers and the two adjacent radiating sheets are provided with third via holes, axes of the third via holes of the plurality of dielectric layers are parallel or coincident, the third via holes are for accommodating the metal pillars, a third via hole of the first dielectric layer is respectively electrically connected to the first via hole of the first dielectric layer and the second via hole of the first dielectric layer through the metal substrate, the third via holes of the adjacent dielectric layers are electrically connected through the metal layers between the adjacent dielectric layers.

3. The dual-polarized filtering antenna unit according to claim 2, wherein the plurality of dielectric layers comprises a target dielectric layer and a non-target dielectric layer, the third via holes are only provided in the target dielectric layer of the plurality of dielectric layers, and the target dielectric layer comprises the first dielectric layer.

4. The dual-polarized filtering antenna unit according to claim 3, wherein the target dielectric layer is a plurality of the adjacent dielectric layers.

5. The dual-polarized filtering antenna unit according to claim 2, wherein the third via holes are located on a symmetry line of the two adjacent radiating sheets.

6. The dual-polarized filtering antenna unit according to claim 1, wherein the plurality of dielectric layers comprise M dielectric layers, diameters of the first via holes of N dielectric layers close to the metal substrate are larger than diameters of the first via holes of M-N dielectric layers far from the metal substrate; diameters of the second via holes of the N dielectric layers close to the metal substrate are larger than diameters of the second via holes of the M-N dielectric layers far from the metal substrate, M, N are integers, N is less than M.

7. The dual-polarized filtering antenna unit according to claim 1, wherein diameters of the first via holes, and the second via holes in a same dielectric layer are the same.

8. The dual-polarized filtering antenna unit according to claim 1, wherein a sum of lengths of the first sub-path and the second sub-path, and a half wavelength of a signal to be filtered out of the dual-polarized filtering antenna unit are the same.

9. The dual-polarized filtering antenna unit according to claim 1, wherein the radiating layer comprises a plurality of radiating sheets, one of the first via holes and one of the second via holes are provided in each area where a dielectric layer corresponding to a radiating sheet.

10. The dual-polarized filtering antenna unit according to claim 2, wherein the plurality of radiating sheets are in a matrix arrangement.

11. The dual-polarized filtering antenna unit according to claim 1, wherein the radiating layer comprises a first radiating sheet and a second radiating sheet, the first radiating sheet and the second radiating sheet are provided on both sides of a symmetry line of the metal substrate, areas where the plurality of dielectric layers correspond to the first radiating sheet are provided with fourth via holes and fifth via holes, the fourth via holes are connected with the fifth via holes, axes of the fourth via holes of the plurality of dielectric layers are parallel or coincident, axes of the fifth via holes of the plurality of dielectric layers are parallel or coincident, the fourth via holes and the fifth via holes are for accommodating metal pillars, the fourth via holes of adjacent dielectric layers are electrically connected through the metal layers between the adjacent dielectric layers, the fifth via holes of adjacent dielectric layers are electrically connected through the metal layers between the adjacent dielectric layers;

areas corresponding to the plurality of dielectric layers and the second radiating sheet are provided with sixth via holes and seventh via holes, the sixth via holes are connected with the seventh via holes, axes of the sixth via holes of the plurality of dielectric layers are parallel or coincident, axes of the seventh via holes of the plurality of dielectric layers are parallel or coincident, the sixth via holes and the seventh via holes are for accommodating metal pillars, the sixth via holes of adjacent dielectric layers are electrically connected through the metal layers between the adjacent dielectric layers, the seventh via holes of adjacent dielectric layers are electrically connected through the metal layers between the adjacent dielectric layers;

wherein the fourth via holes in the first dielectric layer in the plurality of dielectric layers are electrically connected with the sixth via holes or the seventh via holes through the metal substrate, the fifth via holes in the first dielectric layer in the plurality of dielectric layers are electrically connected with the sixth via holes or the seventh via holes through the metal substrate.

12. The dual-polarized filtering antenna unit according to claim 2, wherein electric feed holes are provided in the areas corresponding to the reserved areas between the plurality of dielectric layers and the adjacent two radiating sheets, and the electric feed holes are for accommodating metal pillars, the antenna unit further comprises a first feed line and a second feed line, the first feed line is connected to an electric feed hole of the first dielectric layer, and the second feed line is connected to an electric feed hole of the second dielectric layer.

13. The dual-polarized filtering antenna unit according to claim 1, wherein distances between the axes of the first via holes of the plurality of dielectric layers are the same, distances between the axes of the second via holes of the plurality of dielectric layers are the same.

14. The dual-polarized filtering antenna unit according to claim 1, wherein the axes of the first via holes in a portion of adjacent dielectric layers are coincident, the axes of the first via holes in remaining adjacent dielectric layers are parallel and separated by a same preset distance.

15. The dual-polarized filtering antenna unit according to claim 1, wherein the radiating layer comprises four radiating sheets, and each of the radiating sheets is respectively located in four quadrants with a center of the metal substrate as an origin point.

16. The dual-polarized filtering antenna unit according to claim 2, wherein a shape of the radiating sheets is circular, rectangular, triangular or fan-shaped.

17. A dual-polarized filtering antenna array, comprising dual-polarized filtering antenna units provided in an array, the dual-polarized filtering antenna units being the dual-polarized filtering antenna unit according to claim 1.

18. The dual-polarized filtering antenna unit according to claim 9, wherein the plurality of radiating sheets are in a matrix arrangement.

* * * * *